(12) United States Patent
Guerreiro et al.

(10) Patent No.: US 10,652,466 B2
(45) Date of Patent: May 12, 2020

(54) METHOD AND DEVICE FOR STABILIZATION OF A SURROUND VIEW IMAGE

(71) Applicant: Applications Solutions (Electronic and Vision) Ltd, Lewes (GB)

(72) Inventors: Rui Guerreiro, Hove (GB); Carlos Silva, Eastbourne (GB); Andreas Panakos, Neu-Ulm (DE); Dev Yadav, Abingdon (GB)

(73) Assignee: APPLICATIONS SOLUTIONS (ELECTRONIC AND VISION) LTD, Luwes (GB)

( * ) Notice: Subject to any disclaimer, the term of this patent is extended or adjusted under 35 U.S.C. 154(b) by 141 days.

(21) Appl. No.: 15/678,724

(22) Filed: Aug. 16, 2017

(65) Prior Publication Data

US 2017/0347030 A1  Nov. 30, 2017

Related U.S. Application Data

(63) Continuation of application No. PCT/EP2016/005096, filed on Jan. 19, 2016.

(30) Foreign Application Priority Data

Feb. 16, 2015 (EP) ..................... 15155161

(51) Int. Cl.
*G06T 7/80* (2017.01)
*G06T 7/13* (2017.01)
(Continued)

(52) U.S. Cl.
CPC ......... *H04N 5/23267* (2013.01); *G06T 5/006* (2013.01); *G06T 7/13* (2017.01);
(Continued)

(58) Field of Classification Search
CPC . G06T 2207/30252; G06T 2207/10016; G06T 7/246; G06T 7/80;
(Continued)

(56) References Cited

U.S. PATENT DOCUMENTS

2014/0043473 A1* 2/2014 Gupta ................. H04N 17/00
348/135
2015/0363652 A1* 12/2015 Lee ........................ G06T 7/20
382/104

FOREIGN PATENT DOCUMENTS

EP  2091020 A1  8/2009

OTHER PUBLICATIONS

Zhu et al., Using vanishing points to estimate parameters of fisheye camera, IET Computer Vision, 2013, pp. 362-372 (Year: 2013).*

(Continued)

*Primary Examiner* — Dave Czekaj
*Assistant Examiner* — Samuel D Fereja (57) ABSTRACT

A method and a device for image stabilization of an image sequence of one or more cameras of a vehicle are disclosed. Images of the surroundings of the vehicle are recorded and image points of the recorded images are projected to a unit sphere, where the projection includes applying a lens distortion correction. For each of the one or more cameras, a vanishing point is calculated using the projected image points on the unit sphere and a motion of the vanishing point on the unit sphere is tracked. The motion of the vanishing point is used to calculate a corrected projection to a ground plane.

12 Claims, 6 Drawing Sheets

(51) Int. Cl.
H04N 5/232 (2006.01)
G06T 7/246 (2017.01)
G06T 5/00 (2006.01)
G06T 7/277 (2017.01)

(52) U.S. Cl.
CPC .............. *G06T 7/246* (2017.01); *G06T 7/277* (2017.01); *G06T 7/80* (2017.01); *H04N 5/23238* (2013.01); *H04N 5/23254* (2013.01); *H04N 5/23258* (2013.01); *G06T 2207/10016* (2013.01); *G06T 2207/20061* (2013.01); *G06T 2207/30244* (2013.01); *G06T 2207/30252* (2013.01)

(58) Field of Classification Search
CPC . G06T 2207/30256; G06T 2207/30261; G06T 2207/30244; G06T 2207/10048; G06T 7/579; G06T 7/73; G06T 7/74; G06T 2207/30204; G06T 7/13; G06T 7/50; G06T 7/85; G06T 2207/20024; G06T 2207/30196; G06T 3/4038; G06T 7/55; G06T 15/00; G06T 15/20; G06T 15/50; G06T 2207/30264; G06T 2210/62; G06T 2215/16; G06T 3/0093; G06T 7/20; G06T 11/003; G06T 2207/30248; G06T 2219/008; G06T 5/006; G06T 7/248; G06T 7/251; G06T 7/30; G06T 7/70; G06T 2207/10004; G06T 7/277; G06T 7/344; G06T 2207/20021; G06T 2207/30208; G06T 3/0062; G06T 7/215; G06T 7/60; B60R 2300/105; B60R 11/04; B60R 1/00; B60R 2300/8093; B60R 21/0152; B60R 2300/402; B60R 21/01538; B60R 200/1253; B60R 21/01534; B60R 21/01536; B60R 21/01552; B60R 2300/106; B60R 2300/304; B60R 2300/8033; B60R 2300/804; B60R 2300/8053; B60R 21/0134; B60R 21/01516; B60R 21/0153; B60R 21/01542; B60R 25/25; B60R 25/255; B60R 25/257; B60R 21/013; B60R 25/252; B60R 2300/307; B60R 16/037; B60R 2001/1223; B60R 2011/0026; B60R 2021/0027; B60R 2021/01315; B60R 21/01544; B60R 21/01548; B60R 21/01554; B60R 2300/802; B60R 2022/208; B60R 21/0136
See application file for complete search history.

(56) References Cited

OTHER PUBLICATIONS

Chang S-L et al: "Video Stabilization for a Camcorder Mounted on a Moving Vehicle", IEEE Transactions on Vehicular Technology, vol. 53 No. 6 Nov. 2004, pp. 1636-1648.
Xianghua Ying et al: "Fisheye Lenses Calibration Using Straight-Line Spherical Perspective Projection constraint", National Laboratory of Pattern Recognition, Institute of Automation, Chinese Academy of Sciences, 2006.
Barnard Stephen et al, "Interpreting Perspective Images", Artificial Intelligence, Elsevier vol. 21, Issue 4, Nov. 1983 p. 435-462.
International Search Report and Written Opinion dated Mar. 8, 2016 from corresponding International Patent Application No. PCT/EP2016/050966.
European Search Report dated Jul. 29, 2015 for corresponding German Patent Application No. 15155161.
Vincent, Geoffrey, et al, Apports des Camera Fish-eye (hypergones) au positionnement en milier urbain. http://eprints2.insa-strasbourg.fr/1553/ France 2013.
Vella, Filippo et al, "Digital Image Stabilization by Adaptive Block Motion Vectors Filtering", IEEE Trans. Consumer Electronics, 2002.
Geumlek, Joseph, et al, "Contextual Point Matching for Video Stabilization: Sea Shell Sketch". University of California Irvine, 2012.
Zhang, Yanhao, et al, "Video stabilization based on saliency driven SIFT matching and discriminative RANSAC", in: Proceedings of the Third International Conference on Internet Multimedia Computing and Service Chengdu, China Aug. 5-7, 2011.
International Written Opinion dated Feb. 7, 2017 for corresponding German Patent Application No. PCT/EP2016/050966.

* cited by examiner

METHOD AND DEVICE FOR STABILIZATION OF A SURROUND VIEW IMAGE

CROSS-REFERENCE TO RELATED APPLICATIONS

This application claims the benefit of PCT Application PCT/EP2016/050966, filed Jan. 19, 2016, which claims priority to European Application EP 15155161.1, filed Feb. 16, 2015. The disclosures of the above applications are incorporated herein by reference.

TECHNICAL FIELD

The current disclosure relates to driver assistance systems, and in particular, to a driver assistance system that has an input data stream of one or more cameras.

BACKGROUND

Advanced driver assistance systems (ADAS) are systems developed to automate and enhance vehicle systems for safety and better driving. Many driver assistance systems use information about a vehicle's position, orientation and motion state to assist the driver in various ways. This information may even be used to drive the vehicle autonomously.

Among others, visual odometry may be used to determine a vehicle's position. In a system for visual odometry, cameras are used to record input images and image corrections are applied. Features are detected, the features are matched across image frames and an optical flow field is constructed, for example by using a correlation to establish a correspondence between two images, by feature extraction and correlation or by constructing an optical flow field using the Lucas-Kanade method. Tracking errors are detected, the corresponding outliers are removed and the camera motion is estimated from the optical flow, for example using a Kalman filter or by minimizing a cost function that is based on geometric properties of the features.

In some examples, a method and device for camera calibration includes parameters of the camera, such as the tilting angle and pan angle, that are calibrated using detected parallel lines and corresponding vanishing points. Other examples describe the detection of vanishing points using a projection onto a normalized unit sphere.

The following references [1] to [3] relate to the subject matter of the present disclosure and are hereby incorporated by reference.

[1] Filippo Vella, Alfio Castorina, Massimo Mancuso, Giuseppe Messina, "Digital Image Stabilization by Adaptive Block Motion Vectors Filtering", IEEE Trans. Consumer Electronics, 2002.

[2] Joseph Geumlek, Ling Han Meng, "Contextual Point Matching for Video Stabilization: Sea Shell Sketch". University of California Irvine, 2012.

[3] Yanhao Zhang, Hongxun Yao, Pengfei Xu, Rongrong Ji, Xiaoshuai Sun, Xianming Liu, "Video stabilization based on saliency driven SIFT matching and discriminative RANSAC", in: Proceedings of the Third International Conference on Internet Multimedia Computing and Service, 2011.

Vella et al. [1] describes a motion estimation method based on block motion vectors. This method is robust but may introduce errors, such as blocks appearing in the final image.

Geumlek et al. [2] applies a contextual shape matching algorithm. This method is computationally-intensive but it outperforms methods which only consider local features in cases where the shapes involved have high degrees of self-similarity, or change in appearance significantly between frames while maintaining a similar overall shape.

Zhang et al. [3] use scale invariant feature transform (SIFT) matching and discriminative RANSAC. A Kalman filter is then applied to complete the motion smoothing task.

SUMMARY

One aspect of the disclosure provides a method for image stabilization of an image sequence from one or more cameras of a vehicle, for example, of surround view or 360° view images. In some examples, a surround view image is obtained from the combined data of a front view camera, a right side view camera, a left side view camera and a rear view camera.

Images of the surroundings of a vehicle are acquired from one or more cameras of the vehicle. Each camera supplies a data stream of consecutive images that are merged to a single sequence of consecutive images. The projection to the ground plane is obtained by merging the respective top down views into a single projection image.

An image distortion function $h-1(x'')$ is applied to the image to obtain a corrected image. In the corrected image, lens distortions are reduced and lines, which correspond to straight object lines and which are curved due to lens distortions, are straightened. In some examples, a distortion correction is provided to remove barrel shaped lens distortions, such as those caused by a fish-eye objective.

At least two corresponding straight lines are detected in the corrected image, which are parallel or essentially parallel to each other in the surroundings of the vehicle.

A position of a vanishing point of the at least two parallel lines on a unit sphere is computed and a motion of the vanishing point on the unit sphere is tracked. In some examples, the motion of the vanishing point is tracked with a prediction filter, such as a Kalman filter. In some examples, an input of the prediction filter includes a value of a motion sensor or a position sensor. For example, a position sensor may be provided by a gyrocompass, by a liquid level sensor or by another type of gravity sensor that indicates an inclination to a vertical direction.

Vanishing points are robust features and they can easily be calculated using the unit sphere. The top view projection for each image is similar to the normal projection model thus the Jacobian matrix can easily be obtained and used to project a Kalman filter for each image.

A change in orientation of the one or more cameras is derived from the tracked motion of the vanishing point and a scaling of the recorded images is computed using the derived change in orientation of the one or more cameras. In some examples, image points are identified as object points at a ground level and are projected to the ground level using an affine projection. A scaling factor is then computed using the distance to the ground level according to the affine projection and the derived camera orientations.

The computation of the scaling factor may furthermore include using predetermined orientation and position data of the cameras, such as a height of a camera above ground level and an orientation of the camera. In some examples, the predetermined orientation and position of the cameras may be obtained as input data from the cameras, pre-stored values or by a camera calibration using a predetermined set-up of the vehicle's surroundings. For example, the pre-determined setup may comprise a floor with a measuring grid.

In some implementations, the distortion correction to the images is based on a lens model of a convex lens, such as a polynomial fish-eye model, or on a Hough transform.

In some examples, the vanishing point of the detected corresponding parallel lines is derived by computing a projection of image points of the detected lines on a unit sphere and by computing the intersection of the corresponding great circles.

In some implementations, the image scaling includes: deriving a true distance between a camera of the surround view system and a ground surface: and computing a scaling factor for an image pixel based on the derived true distance between the camera and an object point on the ground surface.

In some examples, the tracking of the vanishing point includes a tracking with a prediction filter. The tracking filter may include a Kalman filter. In some implementations, input values of the prediction further includes an input from a motion sensor, such as an acceleration sensor of the vehicle and/or from an orientation sensor such as a gyro compass, a liquid level sensor or a gravity sensor.

In a further aspect of the disclosure, a computer program product, such as an executable file on a data carrier or in a persistent or volatile computer memory for executing the aforementioned method is disclosed. The computer program product may refer to an executable file in a hardware component, which is suitable for use in automotive electronics.

According to another aspect of the disclosure, an image correction system for a motor vehicle for compensating a change in orientation of one or more cameras, which are mounted to the motor vehicle is disclosed.

The computation unit includes an input connection for receiving a stream of image data. The input data includes consecutive camera images from at least one camera, which are taken at consecutive times.

The computation unit includes an input connection for receiving images of the surroundings of a vehicle from one or more cameras of the vehicle and a processing unit that is operative apply a lens distortion correction to obtain a corrected image and to detect at least two corresponding straight lines in the corrected image.

Furthermore, the processing unit is operative to derive a position of a vanishing point of the at least two corresponding straight lines on a unit sphere, track a motion of the vanishing point on the unit sphere, and to derive a change in orientation of the one or more cameras from the tracked motion of the vanishing point. The processing unit derives a scaling of the recorded images using the derived change in orientation and a projection of the recorded camera image, or an image derived from the recorded image, to a ground plane.

In some examples, the camera is mounted at a right angle to ground level at a distance d to the ground level, a view angle of the camera below the horizontal is $\beta 1$, and a view angle of the camera above the horizontal is $\beta 2$. For this particular geometrical arrangement, the camera covers a stretch of the street of length:

$$l = d * \left( \frac{\sin(90° - \beta_1)}{\sin(90° - \vartheta + \beta_1)} - \frac{\sin(90° + \beta_2)}{\sin(90° - \vartheta - \beta_2)} \right),$$

which can be derived from the law of sines for triangles.

A similar computation yields the equivalent length of an image pixel as a function of the distance of the pixel to the optical axis of the lens, the camera height, and the camera inclination for a pinhole-camera. In some examples, a lens model is used and a local magnification factor is derived according to the lens model, for example, according to a fish-eye lens model. The equivalent length of a pixel in world coordinates is computed according to the lens model under the assumption that the pixel corresponds to an area of the ground plane.

Another aspect of the disclosure provides a motor vehicle, such as a vehicle, a passenger vehicle, a minibus, a utility vehicle, a pickup, a minivan, or a caravan with an image correction system. One or more cameras of the motor vehicle are connected to the computation unit of the image correction system.

During operation, the cameras deliver image data to the computation unit. In some implementations, there are different operation modi according to an operation state of the vehicle, for example according to a selected gear. By way of example, the image frequency may be reduced when the vehicle is moving slowly, such as in a parking mode or the camera orientation may be adjusted automatically according to a motion state of the vehicle.

A method for image stabilization according to the present disclosure relates to a surround view system, which provides a perspective projection that is similar to the view from a virtual camera above the vehicle which points to the ground. Among others, the image stabilization method provides a stabilization of the ground plane, which avoids errors that are introduced by any motion of anyone of the cameras of the surround view system, such pan and tilt motions. Thereby, a perceptible difference in the merging of the areas may be avoided and the projection may be made consistent.

In some implementations, images of the surroundings of a vehicle from one or more cameras of the vehicle and image points of the recorded images are projected to a unit sphere, where the projection includes applying a lens distortion correction.

At least one vanishing point from the projected image points on the unit sphere is calculated and the motion of the at least one vanishing point is tracked for each of one or more cameras. The motion of at the least one vanishing point is used to calculate a corrected projection to a ground plane. In particular, the tracking may be performed using a prediction filter, such as the Kalman filter.

In some examples, the method includes: deriving, for each of the one or more cameras, a position deviation of the position of an image plane from the motion of the vanishing point; and filtering the position deviation over time. In some examples, the filtering includes filtering with a Kalman filter.

The method may include detecting edges in the recorded images, for example by using a Hough transform, and projecting image points of the detected edges onto the unit sphere.

In some implementations, the distortion correction includes applying a lens distortion correction which is based on a polynomial fish-eye model.

In some implementations, the recalculation of the corrected projection to a ground plane includes deriving a scaling of the recorded images using the filtered position.

In some examples, the method includes: applying a lens distortion correction to obtain a corrected image; detecting at least two corresponding straight lines in a corrected image; deriving a position of a vanishing point of the at least two parallel lines on a unit sphere; and tracking a motion of the vanishing point on the unit sphere.

A vanishing point may also be determined by detecting a clustering of line intersections on the unit sphere. A change in orientation of the one or more cameras is derived from the tracked motion of the vanishing point, and a scaling of the recorded images is calculated using the derived change in orientation.

In some implementations, the method includes deriving a true distance between a camera of the surround view system and a ground surface and computing a scaling factor for an image pixel based on the derived true distance between the camera and the ground surface.

In some examples, the vanishing point of the detected parallel lines is derived by projecting the detected lines on a unit sphere and determining the intersection of corresponding great circles.

The tracking of the vanishing point may include a tracking with a prediction filter, such as the Kalman filter. In some examples, input values of the prediction further comprise an input from a motion sensor of the vehicle.

Furthermore, the present disclosure provides a computer program product for executing the aforementioned method.

Moreover, the present disclosure provides an image correction system for a motor vehicle including a computation unit with an input connection for receiving consecutive camera images from one or more cameras. The computation unit includes an input connection for receiving images of the surroundings of a vehicle from one or more cameras of the vehicle and a processing unit.

The processing unit is operative: to project image points of the recorded images to a unit sphere, where the projection includes applying a lens distortion correction; and to calculate, for each of the one or more cameras, vanishing points from the projected image points on the unit sphere and to track a motion of the vanishing points. Furthermore, the processing unit is operative to calculate, for each of the one or more cameras, an error in the position of an image plane and filtering the position over time and to use the filtered position to calculate a corrected projection to a ground plane.

In some implementations, the processing unit is operative to: apply a lens distortion correction to obtain a corrected image; detect at least two corresponding straight lines in the corrected image derive a position of a vanishing point of the at least two corresponding straight lines on a unit sphere; and track a motion of the vanishing point on the unit sphere. Furthermore, the processing unit is operative to derive a change in orientation of the one or more cameras from the tracked motion of the vanishing point, and to derive a scaling of the recorded images using the derived change in orientation.

Furthermore, the disclosure provides a motor vehicle with the aforementioned image correction system, wherein one or more cameras of the motor vehicle are connected to the computation unit of the image correction system.

The details of one or more implementations of the disclosure are set forth in the accompanying drawings and the description below. Other aspects, features, and advantages will be apparent from the description and drawings, and from the claims.

DESCRIPTION OF DRAWINGS

The application is now explained in further detail with respect to the following Figures in which.

Like reference symbols in the various drawings indicate like elements.

DETAILED DESCRIPTION

Figure 1:
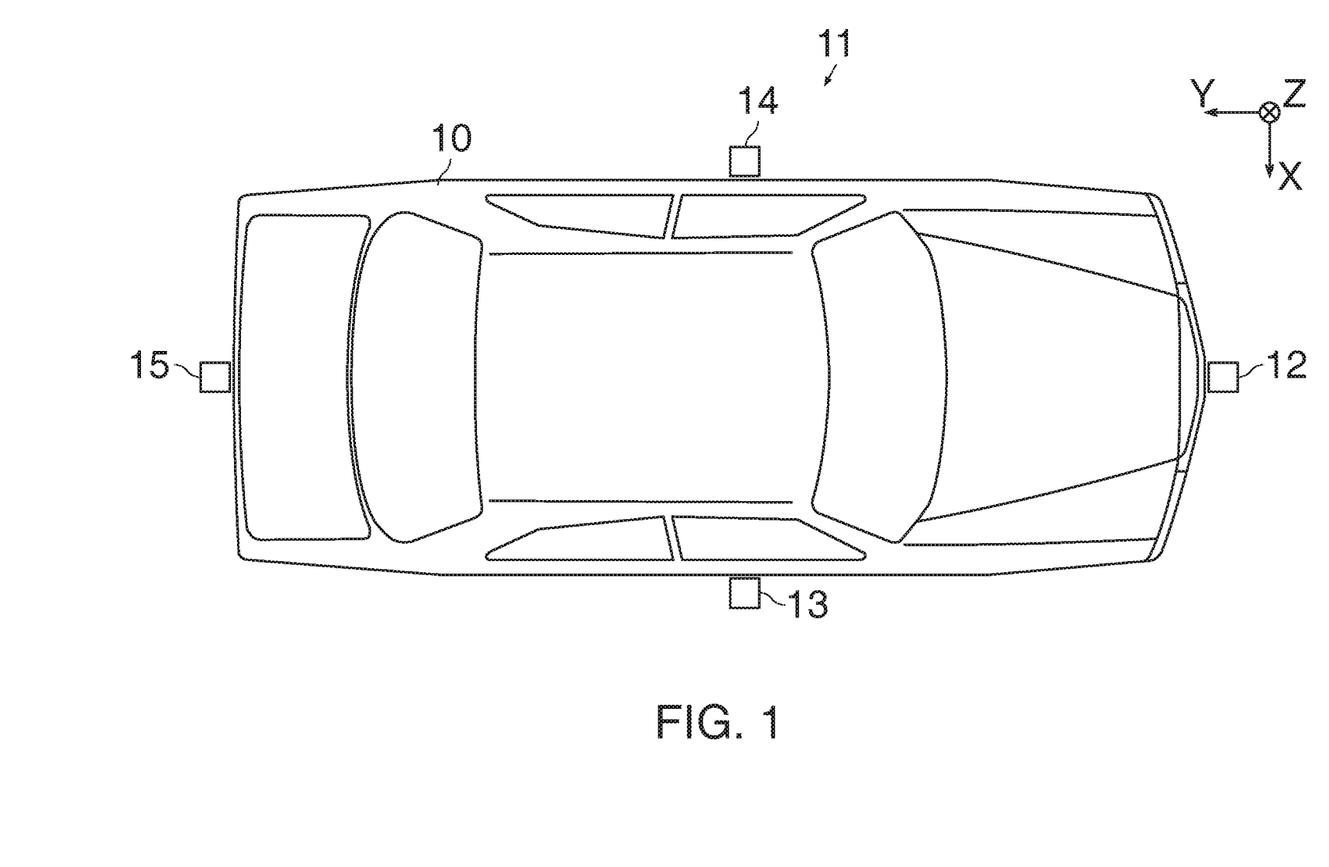
FIG. 1 shows a vehicle with a surround view system.

FIG. 1 shows a vehicle 10 with a surround view system 11. The surround view system 11 comprises a front view camera 12, a right side view camera 13, a left side view camera 14 and a rear view camera 15. The cameras 11-14 are connected to a CPU of a controller, which is not shown in FIG. 1. The controller is connected to further sensors and units, such as a velocity sensor, a steering angle sensor, a GPS unit, and acceleration and orientation sensors.

Figure 2:
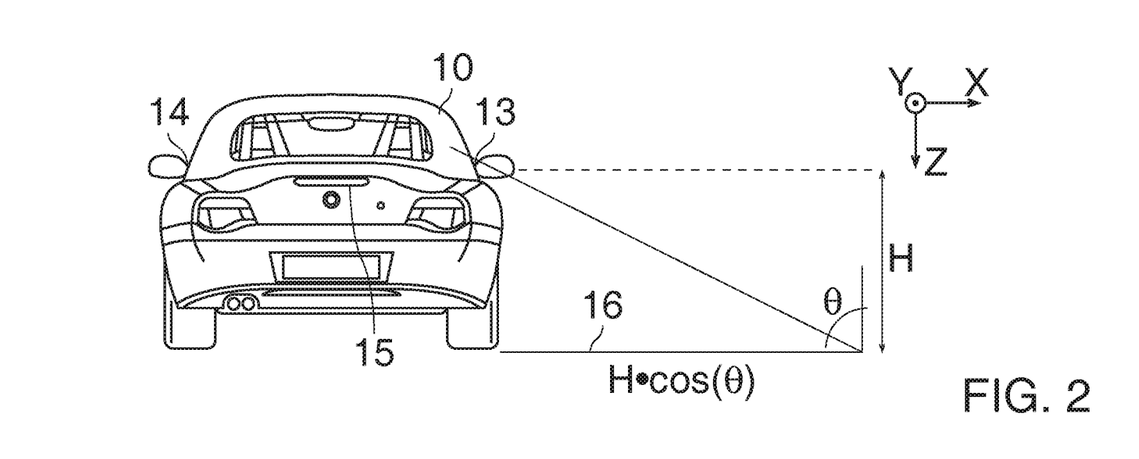
FIG. 2 illustrates a projection to a ground plane of an image point recorded with the surround view system of FIG. 1.
Figure 3:
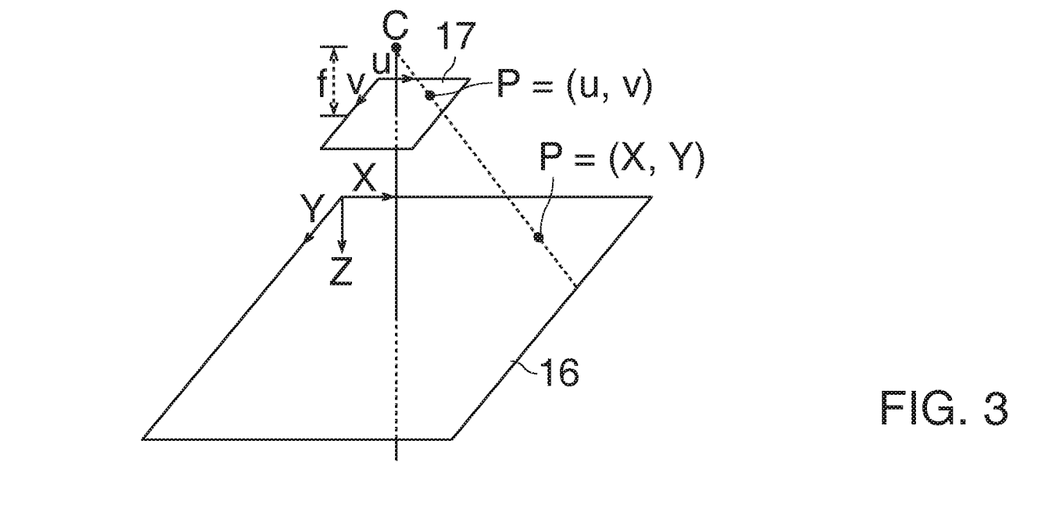
FIG. 3 illustrates in further detail the ground plane projection of FIG. 2.
Figure 4:
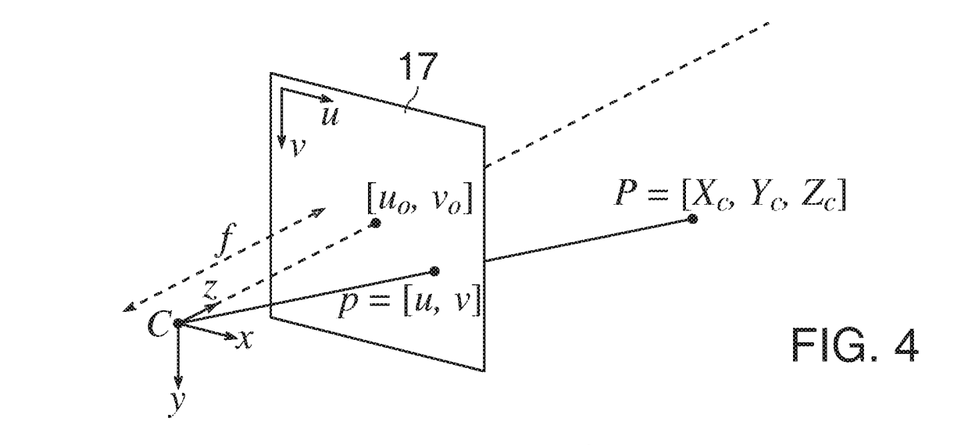
FIG. 4 illustrates in further detail the ground plane projection of FIG. 3.

FIGS. 2, 3 and 4 show a projection to a ground plane 16. FIG. 2 shows a projection of an image point to a ground plane 16. An angle of inclination θ relative to the vertical may be estimated from a location of the image point on the image sensor of the right side view camera 13. If the image point corresponds to a feature of the road, the location of the corresponding object point is the projection of the image point onto the ground plane.

In the example of FIG. 2, the camera 13 has an elevation H above the ground plane. Consequently, the correspond object point is located at a distance $H*\cos(\theta)$ from the right side of the vehicle 10. If an image point corresponds an object point on the ground plane, a projection of the image point to the ground plane represents the real position of an object point in the surroundings. An angle θ of incidence is derived from a location of the image point on the camera sensor. A location Y of the projection is then derived using the height H of the camera sensor above street level as $Y=H*\cos(\theta)$.

FIG. 3 shows an isometric view of the affine projection of FIG. 2. In FIG. 4, a point in a view port plane 17 is denoted by p=(u, v) and a corresponding point in the ground plane 16 is denoted by P=(X, Y). A distance between the view port plane 17 and a projection center C is denoted by the letter "f".

FIG. 4 shows an enlarged section of FIG. 3 in which a central image point p0 is denoted by the coordinates (u0, v0) an image point p is denoted by coordinates (u, v) and a projected image point P on the ground plane is denoted by coordinates (Xc, Yc, Zc).

In a further aspect, FIG. 4 may be seen as a projection of the world point (Xc, Yc, Zc) to an image plane. The 3D point (Xc, Yc, Zc) with the word coordinates Xc, Yc, Zc can be mapped to an image point according to the following equations:

$$u = f\frac{Y_c}{Z_c} + u_0 \tag{1}$$

$$v = f\frac{X_c}{Z_c} + v_0 \tag{2}$$

A camera ray is defined as a normal vector. Thus, a mapping to a camera ray corresponds to a mapping to a point on the surface of a unit sphere. It can be computed by normalizing the vector (u, v, 1).

Figure 5:
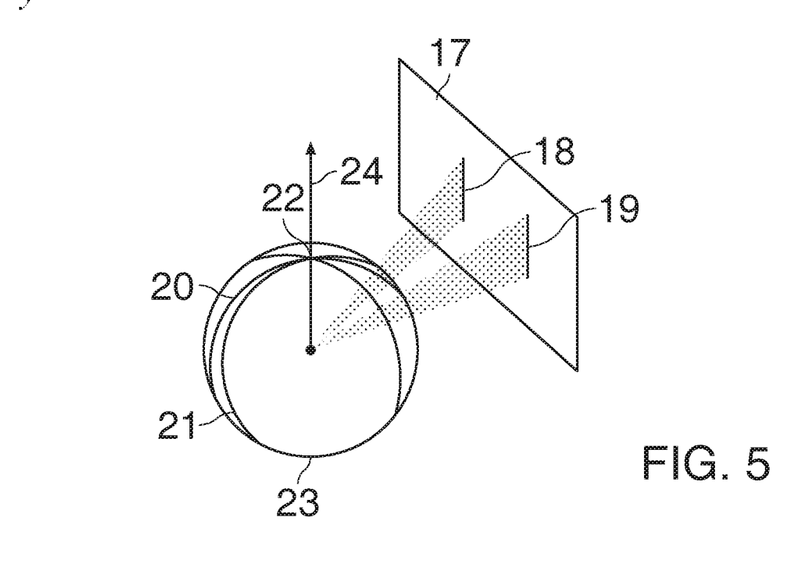
FIG. 5 shows a determination of a vanishing point.

FIG. 5 shows a determination of a vanishing point. A virtual image plane 17, in which line distortions of a camera sensor image have been compensated by a distortion correction, includes a first vertical line 18 and a second vertical line 19.

When the lines 18, 19 are projected onto a unit sphere 23 by using a central projection for which the center of projection is at the center of the unit sphere 23, the projections of the parallel lines 18, 19 form segments of respective great circles 20, 21.

According to the present disclosure, a Jacobian Matrix, which is used in an extended Kalman filter, such as the state matrix and the prediction matrix, may be derived from a normalized projection camera model. The Jacobian matrices may be easier to calculate by using a constraint on the radius.

The intersections of the great circles 20, 21 are the vanishing points of the parallel lines 18, 19. In FIG. 5 one intersection 22 of two intersections of the great circles 20, 21 is shown and a direction 24 of a corresponding vanishing line is indicated.

In some implementations, the vanishing points on the unit sphere 23 are tracked over time using a Kalman filter. In some examples, a distance between vanishing points corresponds to a length of a great circle segment on the unit sphere between the vanishing points and a statistical error is computed based on the distance.

The derived motion of the vanishing points corresponds to a change of camera orientation. In some implementations, a change in camera orientation is compensated using the derived change of camera orientation. In some examples, small amplitude pitch and roll movements, which, among others, are caused by the vehicle's suspension are tracked and compensated for. Yaw movements may be tracked, which are caused, among others, by the steering and a sliding motion of the wheels on a street surface.

In some implementations, the parallel lines of one vanishing point correspond to lateral boundaries of the street. The parallel lines may correspond to demarcations on the street.

Figure 6:
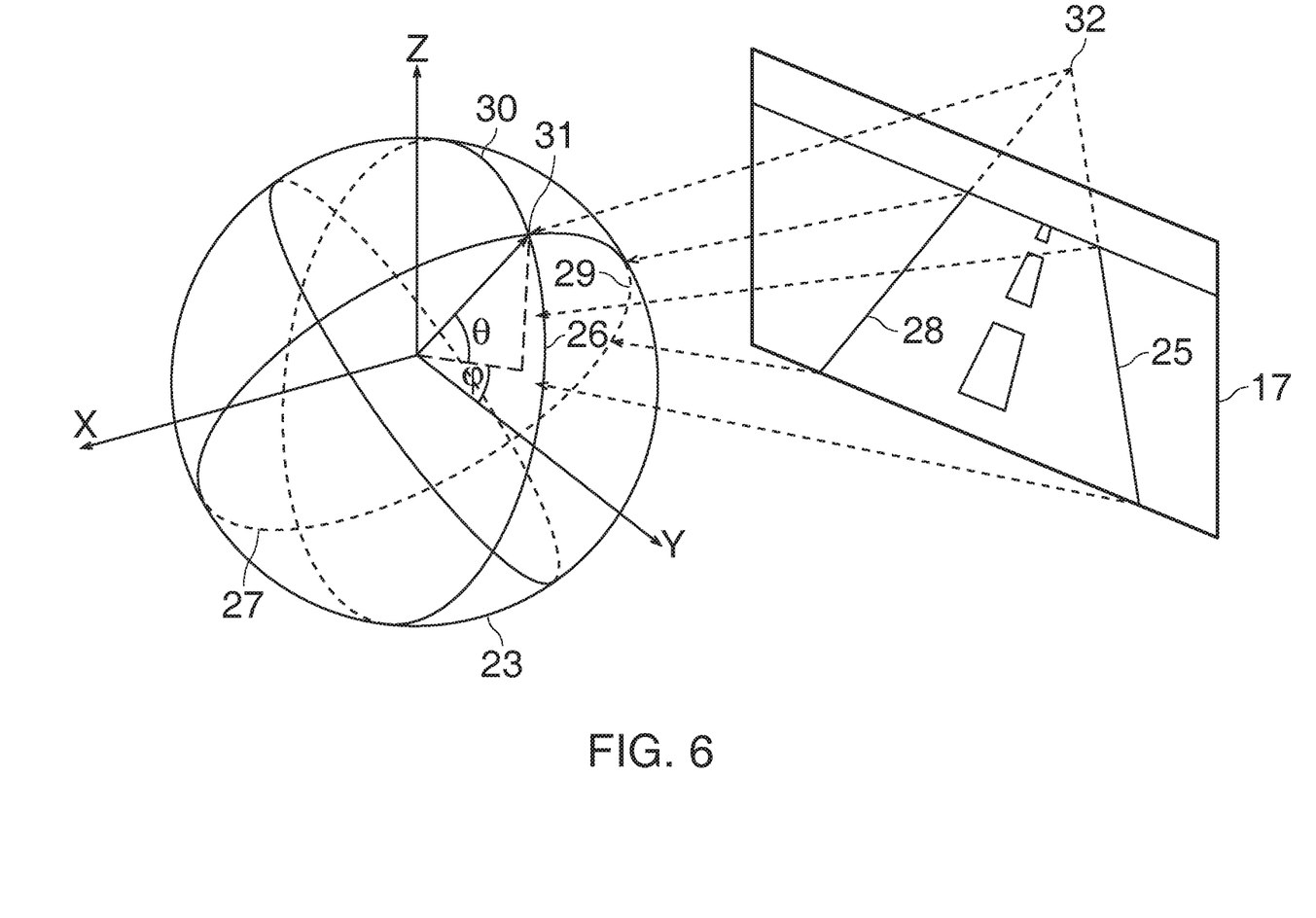
FIG. 6 shows a determination of a vanishing point in further detail.

FIG. 6 shows a further example of a transformation of line segments to segments of great circles and the determination of a vanishing point. The image planes 17 of FIGS. 5 and 6 represent a virtual image plane in computer memory in which lens distortions, which are present in the original sensor data of the camera sensors, have been reduced or removed by applying a distortion correction transformation.

A first line segment 25, which is the image of a first street border, is mapped to a segment 26 of a first great circle 27. A second line segment 28, which is the image of a second street border, is mapped to a segment 29 of a second great circle 30. The first and second great circles 27, 30 intersect at a vanishing point 31. This intersection point may be determined by computing an intersection of the great circles 27, 30 or also by extending the lines 25, 28, computing their intersection point 32 and mapping the intersection point 32 to the vanishing point 31.

In general, it is not known whether two given straight lines in a camera image correspond to parallel object lines and have a common vanishing point. Therefore, the computation of a vanishing point from two arbitrary line segments may also yield a "false vanishing point". False vanishing points may be avoided or eliminated in various ways. For example, the image information can be analyzed and the line segments be identified as street border. Furthermore, in some examples, a stored digital map may is used to determine that the street borders are straight and are suitable for the determination of a vanishing point.

Further methods to avoid false vanishing points may include among others, the use of three-dimensional information from distance measurements or from stereoscopic images, inferences about an object's orientation based on a computational analysis of the camera image, and the computational determination of vanishing point clusters on the unit sphere.

In some implementations, an artificial neural network is trained to detect parallel object lines, such as lines corresponding to street borders, street markings, guardrails, guide posts, lamp posts, horizontal and vertical features of buildings or other straight object features.

Figure 7:
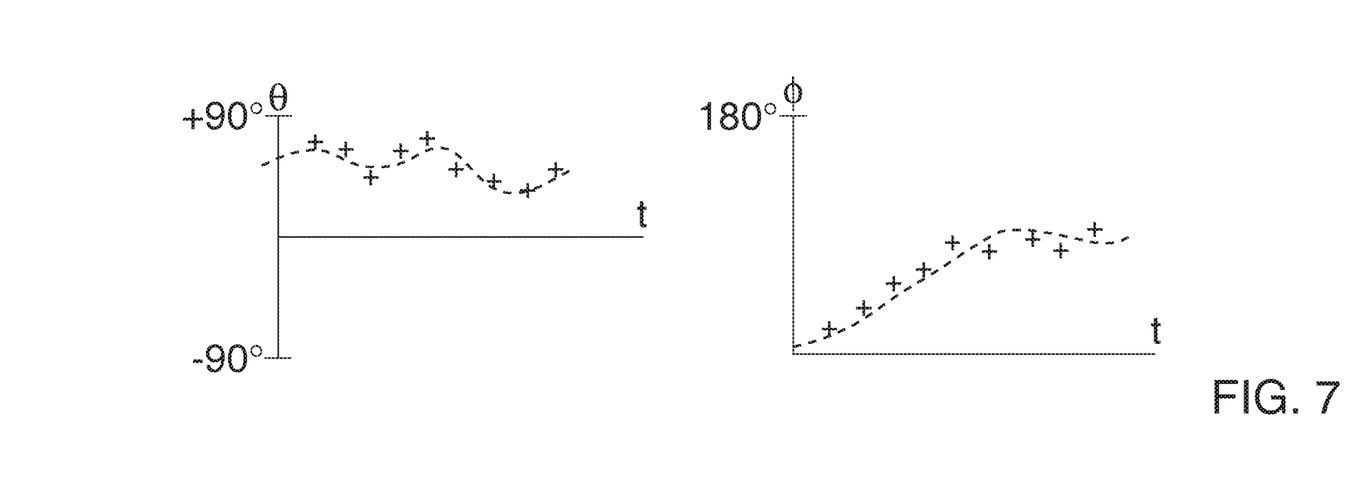
FIG. 7 shows a motion of the vanishing point in spherical coordinates.

FIG. 7 shows spherical coordinates of a locus of a derived vanishing point over time. The spherical coordinates are chosen such that Φ corresponds to a yaw angle and θ corresponds to an elevation angle. FIG. 7 illustrates a situation in which a camera, which is fixed to the vehicle, oscillates around an equilibrium elevation angle and turns together with the vehicle by a yaw angle of about 90 degrees.

Yaw, pitch and roll angles, which are also known as "Tait-Bryan angles" may be obtained from the angles of the spherical coordinates θ, Φ on the unit sphere by the transformation $$\alpha = \tan^{-1}\left(\frac{z}{y}\right) = \tan^{-1}\left(\frac{\sin(\theta)}{\cos(\theta)\sin(\varphi)}\right) \tag{3}$$

$$\beta = \tan^{-1}\left(\frac{z}{x}\right) = \tan^{-1}\left(\frac{\sin(\theta)}{\cos(\theta)\cos(\varphi)}\right) \tag{4}$$

$$\gamma = \varphi \tag{5}$$

if Φ is measured in the x, y plane and Φ=0 corresponds to (x, y)=(1, 0).

Figure 8:
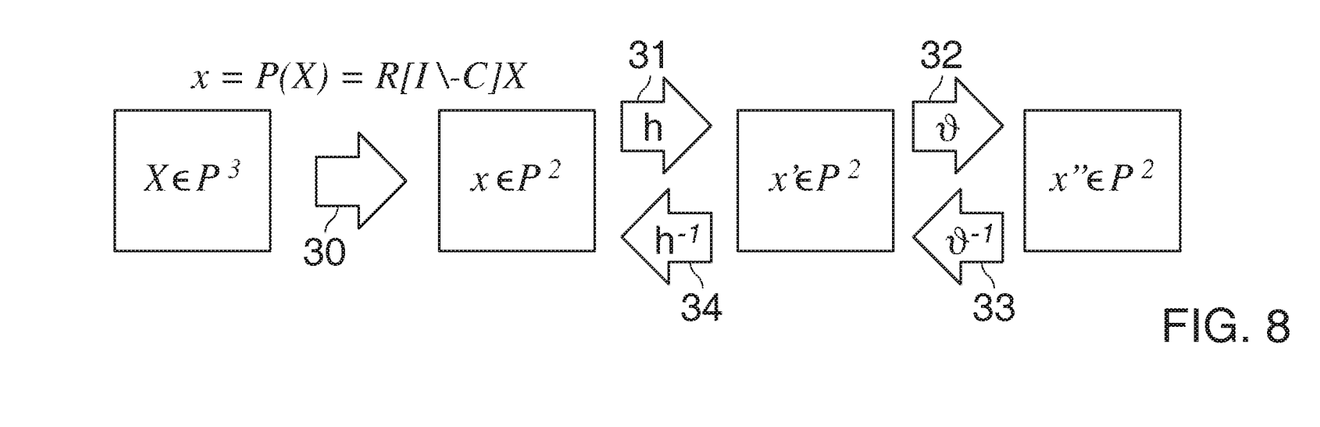
FIG. 8 shows a procedure for deriving an image point of a corrected image.

FIG. 8 illustrates a computational model for deriving an image point x" from an object point or, conversely for deriving an object point from an image point.

In a first transformation step 30, an object point X is projected onto a view port plane. In some examples, the transformation of step 30 is modelled as a rotation R and a translation C of the original object point X onto the view port plane.

In a second transformation step 31, a transformation h distorts the image according to properties of an imaging lens. The reverse transformation h−1 according to step 34 is referred to as distortion correction transformation. The image correction according to step 34 reduces or removes lens distortions according to a pre-defined mathematical model of the lens distortions.

In some implementations, in which a fish-eye objective is modeled, the distortion correction transformation includes a transformation according to a polynomial fish-eye model such as, among others, an odd order polynomial model, a PFET (polynomial fish-eye transformation) model, or a division model. Other lens models for removing barrel-type distortions include, among others, the Kannala-Brandt model, and lens models according to Grossberg and Nayar and according to Gennery.

Furthermore, the distortion correction transformation may include a Hough transform. According to the Hough transform every point in an x-y plane is associated with a parameterized curve r(t)=x*cos(t)+y*sin(t). The parameters of the Hough transform, such as origin and orientation of the coordinate system, are determined by minimizing a distortion measure and/or by detecting lines in the picture and matching the lines to the parameterized curves. The distortion measure is related to a curvature of the image lines.

In some implementations, lines are detected by processing the image using an edge detector and detecting lines in the processed image. The processed image is then transformed into Hough space, which is spanned by the distance r and the angle t. A high intensity in Hough space corresponds to a well detected line.

In a third transformation step 32, a projection $\partial$ is applied which projects the point x' onto a corresponding image pixel x". The projection $\partial$ of step 32 may include irreversible components, such as an averaging step, which models the mapping of image points to a pixel, and reversible components. The inverse of the reversible portion of the transformation $\partial$ according to step 33 is referred to as reverse projection $\partial^{-1}$.

The arrows 33, 34 indicate the respective reverse transformation of the transformations 32 and 31. In a given realization, which may involve information loss such as image clipping and numerical errors, the transformations 31 and 32 are only approximately reversible.

By contrast, the projection according to step 30 is in general not reversible and the reconstruction of an object point X requires further assumptions, such as the recognition of an object and assumption about its orientation, and/or further measurements, such as distance measurements.

In order to remove distortions from an image of image pixels x", the reverse projection is applied in step 33 and the distortion correction is applied in step 34. The resulting two dimensional image is then used to determine straight lines and their corresponding vanishing points, as shown in FIG. 5.

In some implementations, the function h, which models the lens, is used to extend a perspective projection according to a pinhole camera model. In projective or homogeneous coordinates, the pinhole camera model may be written as:

$$sm' = A[R | C]M', \text{ or} \quad (6)$$

$$s\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & c_1 \\ r_{21} & r_{22} & r_{23} & c_2 \\ r_{31} & r_{32} & r_{33} & c_3 \end{bmatrix} \begin{bmatrix} X \\ Y \\ Z \\ 1 \end{bmatrix} \quad (7)$$

Herein, [R|C] stands for a block matrix that is composed of the rotation matrix R and the translation vector C, (X, Y, Z) are the coordinates of a 3D point in the world coordinate space, (u, v) are the coordinates of the projection point in pixel units, A is a camera matrix, or a matrix of intrinsic parameters, (cx, cy) is a principal point that is usually at the image center, and fx, fy are the focal lengths expressed in pixel units.

The matrix A provides an example of the abovementioned instric transformation $\partial$. In general, the function $\partial$ is a generic intrinsic transformation $\partial=\partial$ (fx, 0, cx; 0, fy, cy).

For z≠0, the above transformation can be written in three dimensions as:

$$\begin{bmatrix} x \\ y \\ z \end{bmatrix} = R \begin{bmatrix} X \\ Y \\ Z \end{bmatrix} + t \quad (8)$$

$$x' = \frac{x}{z}, y' = \frac{y}{z} \quad (9)$$

$$u = f_x * x' + c_x, v = f_y * y' + c_y. \quad (10)$$

The lens distortion function h may be integrated in this framework by inserting a transformation (x",y")=h(x',y') and computing u and v as a function of x" and y" instead.

An example of a function h is given by:

$$\begin{bmatrix} x'' \\ y'' \end{bmatrix} = \begin{bmatrix} h_1(x') \\ h_2(y') \end{bmatrix} = \begin{bmatrix} \frac{\theta_d}{r} * x' \\ \frac{\theta_d}{r} * y' \end{bmatrix} \quad (11)$$

where $$\theta_d = \theta(1 + k_1\theta^2 + k_2\theta^4 + k_3\theta^6 + k_4\theta^8), \quad (12a)$$

$$\theta = \text{atan}(r), r^2 = a^2 + b^2, a = \frac{x}{z}, b = \frac{y}{z}. \quad (12b)$$

In some implementations, the polynomial in θ includes also even powers of θ and/or a lower or higher order approximation.

According to the computational method of FIG. 8, a 3D world point Xc is projected onto the surface of a fisheye lens, which is represented by a polynomial function h. Thereby, the point Xs is projected into a point Xm in the sensor plane. The projection onto the sensor plane is affected by the lens distortion and this effect is modelled by the polynomial function h.

By using this camera model, each image point Xm may be mapped into a camera ray, which is a unit vector on the surface of a sphere with radius one. Computationally, the projection may be realized by normalization to a unit vector.

In some implementations, edges are determined in the distorted fisheye image and points of the detected edges are then projected into the camera rays using a camera module which implements the distortion correction. Each line is approximately mapped to a great circle or a segment of a great circle on the unit sphere. The vanishing points are determined by fitting circles. The calculations are simplified because the circles are great circles on the unit sphere, which have radius one.

In some implementations, the camera model is realized by generating a lookup-table for the mapping. The points on the unit sphere are easy to track as the motion is a circle in the surface of the sphere.

Figure 9:
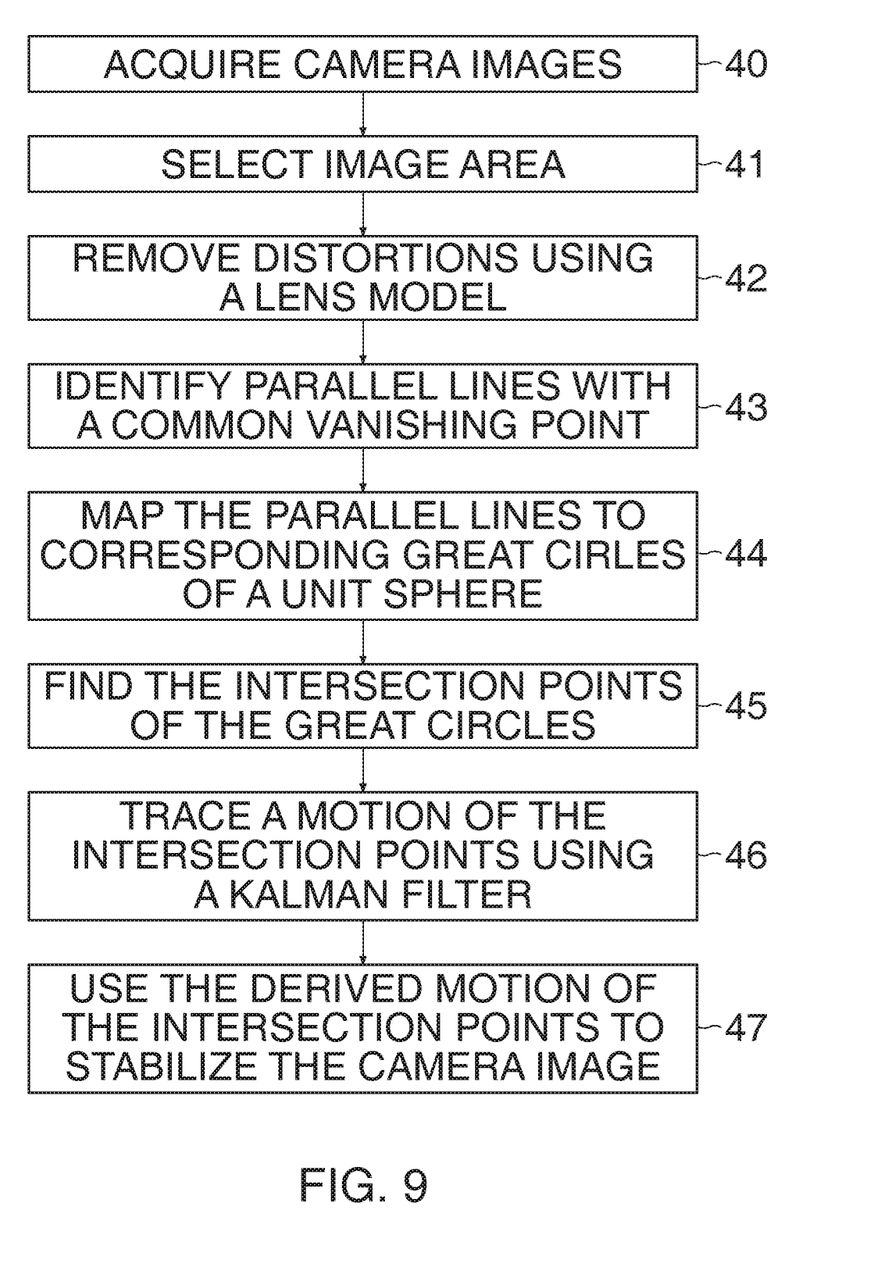
FIG. 9 shows a procedure for an image stabilization according to the present disclosure.

FIG. 9 shows a procedure for image stabilization according to the present disclosure.

In a step 40, one or more camera images are acquired from camera image sensors. In a step 41, a suitable image area is selected. For example, an image portion corresponding to a sky area may be clipped. In a step 42, image distortions are removed using an image transformation that is based on a lens model.

In a step 43, the corrected image is analyzed computationally and lines that correspond to parallel object lines are detected. In some examples, the lines are detected by and edge detection algorithm. The digitalized image may first be transformed by a suitable integral transformation, such as Hough transformation or a Radon transformation, and the straight lines may be detected as features of the transformed image.

In a step 44, the line segments are mapped to corresponding great circles on a unit sphere and, in a step 45, an intersection point of the unit circles is determined. In a step 46, a motion of the intersection point is determined. In some examples, a filter is used, for examples, a Kalman filter, to interpolate and predict the motion of the vanishing point.

If there is more than one vanishing point and those vanishing points all correspond to stationary objects, the motions of the vanishing points are similar. In some implementations, the motions of the vanishing points are averaged to obtain an average motion. The resulting motion is used as an average of the camera motion. In a step 47, the derived motion of the vanishing points is used to stabilize the camera image.

The sequence of the steps in FIG. 9 are provided by way of example. The steps in a given realization may be different from the sequence of FIG. 9. For example, in a further example, straight lines are detected first and a vanishing point is detected only after mapping the lines to corresponding great circles, for example by attributing a vanishing point to a set of lines if the corresponding vanishing points of each pair of lines in the set of lines cluster on the unit sphere.

In this way, a vanishing point may be identified without prior identification of the line segments as street borders or as other objects with a known orientation. The clustering of vanishing points works especially well for objects with many horizontal and vertical lines, which are provided by many types of buildings and artificial structures.

A number of implementations have been described. Nevertheless, it will be understood that various modifications may be made without departing from the spirit and scope of the disclosure. Accordingly, other implementations are within the scope of the following claims.

What is claimed is:

1. A method for image stabilization of an image sequence of one or more cameras of a vehicle, the method comprising:
   recording images of surroundings of the vehicle from one or more cameras of the vehicle;
   projecting image points of the recorded images to a unit sphere, wherein the projection comprises applying a lens distortion correction;
   calculating, for each of the one or more cameras, at least one vanishing point from the projected image points on the unit sphere;
   tracking a motion of the at least one vanishing point; and
   using the motion of the at least one vanishing point to calculate a corrected projection to a ground plane;
   applying a lens distortion correction to obtain a corrected image;
   detecting at least two corresponding straight lines in the corrected image;
   deriving a position of a vanishing point of the at least two straight lines on a unit sphere;
   tracking a motion of the vanishing point on the unit sphere;
   deriving a change in orientation of the one or more cameras from the tracked motion of the vanishing point; and
   deriving a scaling of the recorded images using the derived change in orientation.

2. The method of claim 1, further comprising:
   deriving, for each of the one or more cameras, a position deviation of the position of an image plane from the motion of the vanishing point and filtering the position deviation over time.

3. The method of claim 1, further comprising:
   detecting edges in the recorded images and projecting image points of the detected edges onto the unit sphere.

4. The method of claim 1, wherein the distortion correction comprises applying a lens distortion correction that is based on a polynomial fish-eye model.

5. The method of claim 1, wherein the recalculation of the corrected projection to a ground plane comprises deriving a scaling of the recorded images using the filtered position.

6. The method of claim 1, wherein the image scaling comprises:
   deriving a true distance between a camera of the surround view system and a ground surface; and
   computing a scaling factor for an image pixel based on the derived true distance between the camera and the ground surface.

7. The method of claim 1, wherein the vanishing point of the detected straight lines is derived by projecting the detected lines on a unit sphere and determining the intersection of corresponding great circles.

8. The method of claim 1, wherein the tracking of the vanishing point comprises a tracking with a prediction filter.

9. The method of claim 8, wherein input values of the prediction filter further comprise an input from a motion sensor of the vehicle.

10. A computer program product stored on a non-transitory computer readable medium for executing a method for image stabilization of an image sequence of one or more cameras of a vehicle, the method comprising:
    recording images of surroundings of the vehicle from one or more cameras of the vehicle;
    projecting image points of the recorded images to a unit sphere, wherein the projection comprises applying a lens distortion correction;
    calculating, for each of the one or more cameras, at least one vanishing point from the projected image points on the unit sphere;
    tracking a motion of the at least one vanishing point; and
    using the motion of the at least one vanishing point to calculate a corrected projection to a ground plane;
    applying a lens distortion correction to obtain a corrected image;
    detecting at least two corresponding straight lines in a corrected image;
    deriving a position of a vanishing point of the at least two straight lines on a unit sphere;
    tracking a motion of the vanishing point on the unit sphere;
    deriving a change in orientation of the one or more cameras from the tracked motion of the vanishing point; and
    deriving a scaling of the recorded images using the derived change in orientation.

11. An image correction system for a motor vehicle comprising a computation unit with an input connection for receiving consecutive camera images from one or more cameras, the computation unit comprising an input connection for receiving images of surroundings of a vehicle from one or more cameras of the vehicle and a processing unit that is operative to:

project image points of the recorded images to a unit sphere, wherein the projection comprises applying a lens distortion correction;

calculate, for each of the one or more cameras, vanishing points from the projected image points on the unit sphere;

track a motion of the vanishing points;

calculate, for each of the one or more cameras, an error in a position of an image plane and filtering the position over time;

utilize the filtered position to calculate a corrected projection to a ground plane;

apply a lens distortion correction to obtain a corrected image;

detect at least two corresponding straight lines in the corrected image;

derive a position of a vanishing point of the at least two corresponding straight lines on a unit sphere;

track a motion of the vanishing point on the unit sphere;

derive a change in orientation of the one or more cameras from the tracked motion of the vanishing point; and derive a scaling of the recorded images using the derived change in orientation.

12. A motor vehicle with an image correction system of claim 11, wherein one or more cameras of the motor vehicle are connected to the computation unit of the image correction system.

* * * * *